United States Patent [19]

Gordon

[11] E Re. 29,684

[45] Reissued Jun. 27, 1978

[54] WELDING HELMET WITH EYE PIECE CONTROL

[76] Inventor: Mack Gordon, 29085 Solon Rd., Cleveland, Ohio 44139

[21] Appl. No.: 692,295

[22] Filed: Jun. 3, 1976

Related U.S. Patent Documents

Reissue of:

[64] Patent No.: 3,873,804
Issued: Mar. 25, 1975
Appl. No.: 427,988
Filed: Dec. 26, 1973

U.S. Applications:

[63] Continuation-in-part of Ser. No. 244,180, Apr. 14, 1972, abandoned.

[51] Int. Cl.[2] ..... B23K 9/32
[52] U.S. Cl. ..... 219/147; 2/8
[58] Field of Search ..... 2/8; 219/147; 350/160 LC

[56] References Cited

U.S. PATENT DOCUMENTS

| | | | |
|---|---|---|---|
| 3,731,986 | 5/1973 | Fergason | 350/150 X |
| 3,741,629 | 6/1973 | Kahn | 350/160 LC |
| 3,918,796 | 11/1975 | Fergason | 350/160 LC |

FOREIGN PATENT DOCUMENTS

| | | | |
|---|---|---|---|
| 2,315,308 | 3/1973 | Germany | 2/8 |
| 375,586 | 2/1930 | United Kingdom | 219/147 |
| 565,395 | 1/1944 | United Kingdom | 219/147 |

OTHER PUBLICATIONS

Kahn, Applied Physics Letters, vol. 18, No. 6, 3/71, "Cholesteric Liquid Crystals for Optical Applications", p. 231.

*Primary Examiner*—Elliot A. Goldberg
*Attorney, Agent, or Firm*—Thomas H. Murray

[57] ABSTRACT

A protective welding lens assembly is shown, as for use in the eye piece of a welding helmet, utilizing a liquid crystal together with an electrical circuit which applies a suitable electrical potential to the liquid crystal to change the same from a uniform light transmitting condition to a uniform approximately opaque condition of very small light transmission solely in response to approach to the welding electrode close to the workpiece to be welded.

14 Claims, 12 Drawing Figures

WELDING HELMET WITH EYE PIECE CONTROL

Matter enclosed in heavy brackets [ ] appears in the original patent but forms no part of this reissue specification; matter printed in italics indicates the additions made by reissue.

CROSS-REFERENCE TO RELATED APPLICATION

This application is a continuation-in-part of application Ser. No. 244,180, filed Apr. 14, 1972, now abandoned.

BACKGROUND OF THE INVENTION

It is common at the present time to use a hinged window in connection with the eye piece of a welder's helmet, which window is made of darkened, almost opaque glass. The window is in raised position when the welder is arranging his work and is flipped down to a protective position in front of the eye piece before the welder strikes the arc between the electrode and the workpiece. For very rapid automatic operation, or for operation that anticipates the striking of an electric welding arc, utilization of the novel welding lens assembly of this invention will make the welder's eye protection as complete as possible. This is a protection which is not available as the present time.

This invention makes use of a liquid crystal described and claimed in U.S. Pat. No. 3,731,986, granted May 8, 1973 to James L. Fergason. This crystal provides a shutter which in the present inventon operates from a transparent condition to a uniform partially opaque condition in 1/500 of a second or 2 milliseconds. This action is sufficiently fast to protect the eyes from the light generated when a welder strikes an arc between his electrode and the workpiece.

An object of the present invention is to provide a protective welding lens assembly for use with an electrical welding machine, said assembly fixed in position in a welder's helmet in place of the normal eye piece, and comprising a layer of liquid crystal material sandwiched between opposing parallel plates coated with transparent conducting films with liquid crystal material enclosed between the plates between and parallel to a pair of polarizers so arranged that when a suitable electrical potential is established across the conducting films and the liquid crystal layer, the lens assembly will change from a uniform light transmitting condition to a uniform eye protecting high density approximately opaque condition, together with an electrical circuit connected for supplying a suitable electrical potential across the conducting films and the liquid crystal layer.

Other objects and advantages of this invention will be apparent from the accompanying drawings and specification and the essential features thereof will be set forth in the appended claims.

In the drawings,

FIG. 3 is a schematic drawing of two of the polarized plates utilized in the structure of FIG. 2;

FIG. 4 is a perspective view illustrating the effect of change of polarization of the fluid crystal sandwich of FIG. 2.

Figure 9:
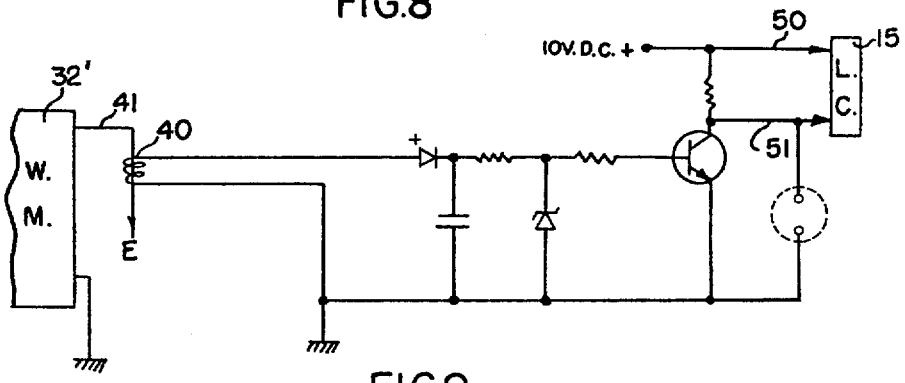
Figure 10:
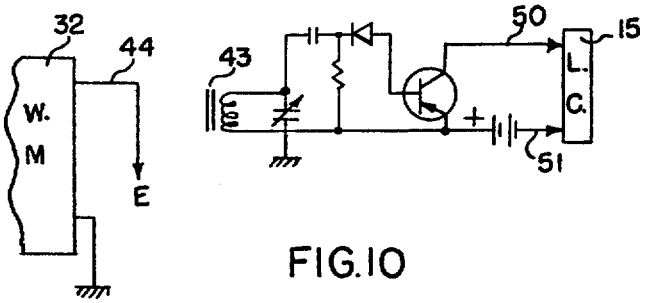
Figure 11:
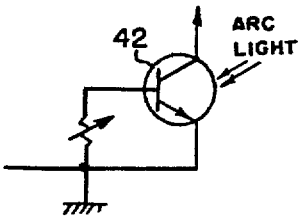
Figure 12:
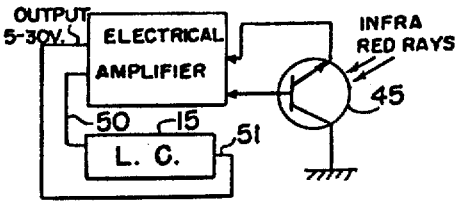

FIG. 9 is an electrical operating circuit for applying potential to the liquid crystal wherein a welding machine utilizes alternating current and the triggering device includes a voltage transformer operatively associated with the electrical cable leading to the welding electrode for energizing the switching device responsive to electrical flow caused in the transformer when the welding electrode approaches a workpiece;

FIG. 10 shows an energizing electrical circuit for the liquid crystal for use with a welding machine utilizing either direct or alternating current and includes an electromagnetic-responsive antenna operatively associated with the electrical cable leading to the welding electrode and the signal from the antenna actuates the switching device to supply potential to the liquid crystal;

FIG. 11 is a safety device to be added to the circuit of FIG. 9 where indicated by a dotted circle and provides a phototube responsive to arc light from the welding electrode to cause the liquid crystal to turn to its more opaque condition as a safety back-up for the triggering device of FIG. 9 in case the latter does not work; while FIG. 12 is a modification where the electrical amplifier circuit for applying potential to the liquid crystal is responsive to infra-red rays emitted between a welding electrode and a workpiece upon approach of the electrode close to the workpiece.

Figure 1:
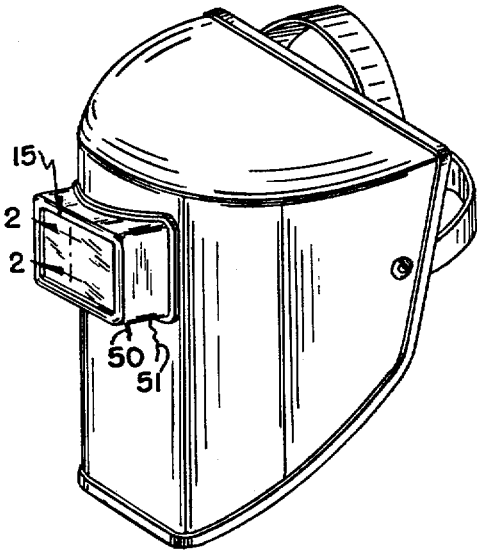
FIG. 1 is one embodiment of a welder's helmet with an eye piece utilizing the present invention.

FIG. 1 shows one embodiment of a welder's helmet having a liquid crystal assembly utilized as a lens as shown at 15 in place of the usual eye piece of such a helmet. Liquid crystals are becoming fairly well known but a brief description will be inserted here so that one may clearly understand the operation of this invention.

Figure 2:
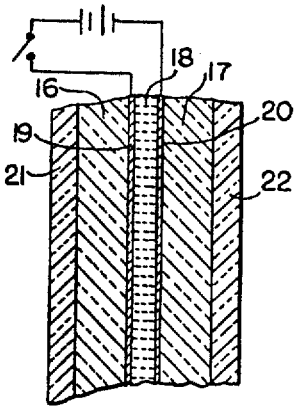
FIG. 2 is a fragmental sectional view taken along the line 2—2 of FIG. 1 and greatly enlarged.

Referring to FIGS. 2 and 3, transparent plates 16 and 17, preferably of glass, are parallel and spaced apart by suitable spacers, not shown, by spacing of approximately 0.10 to 2.0 mils. The space between these plates is filled with a nematic-phase liquid crystal material 18 with a positive dielectric anisotropism. The molecules in a nematic-phase liquid crystal material appear to be long and straight, and they tend to lie parallel like matches in a match box. They are free to move with respect to one another and there is some variation with respect to exact parallelism. On the interior surfaces of the plates 16 and 17, and in contact with the liquid crystal layer 18, are coatings 19 and 20 of thin, transparent electro-conductive material, known coatings being of tin oxide or indium oxide. Outside of the plates 16 and 17 are conventional polarizers 21 and 22, one of these layers being polarized at right angles to the other. In preparation of the liquid crystal sandwich, the layers 19 and 20 are prepared by being stroked or rubbed unidirectionally with, for example, a cotton cloth. The direction of rubbing of plate 16 is indicated by the lines 19a, and that of plate 17 is indicated by the lines 20a at right angles to the lines 19a.

The effect of the liquid crystal sandwich 15 on light passing therethrough is schematically illustrated in FIG. 4. A source of unpolarized or natural light, such as from a welding electrode, illustrated at 23 impinges upon the conventional polarizer 21 which polarizes the light as represented by the broken lines 24. This polarized light, as it passes through the liquid crystal material 18, 19, 20, will be rotated through 90° so that the polarized light is then polarized in a plane represented by the broken lines 25. This polarized light then passes through the second conventional polarizer 22 which, as previously mentioned, is adapted to pass polarized light in a plane which is rotated 90° with respect to the plane of polarization of the polarizer 21. Under these conditions, the lens assembly of this invention is in a uniform light transmitting condition over its entire surface which enables the operator to arrange his workpiece for welding.

Now, if an electrical potential of the order of 5 volts or so, preferably not over 20 volts to avoid electrical shock effects, is applied between the conducting films 19 and 20, the liquid crystal unit will no longer rotate the plane of polarization through 90°. In other words, the polarization previously indicated at 25 will now be at right angles thereto and parallel to the polarization indicated at 24. Under these conditions, the conventional polarizer 22 whose polarization indicated at 26 is at right angles to that indicated at 24, will now block the transmission of light over its entire area. Under these conditions, the liquid crystal sandwich acts as a shutter so that the light coming from the welding electrode is deeply shaded so as not to damage the operator's eyes.

There are a number of circuits for applying electrical energy to the liquid crystal, all of which illustrated hereinafter are responsive solely to the approach of the welded electrode to the workpiece operated upon. It should be understood that all operative circuits are not intended to be illustrated here but merely a number indicating the scope of this invention with respect to such operating circuits.

Automatic electrical means for operating the liquid crystal may be classified into the following groups:

a. Visible light and/or invisible frequencies from the welding arc may be used to trigger a switching device to apply electrical energy to the liquid crystal.

b. A wire loop or current transformer arranged about the welding cable leading from the welding machine to the electrode may supply an electrical pulse to trigger a switching device connected to the liquid crystal and which will operate it when direct current is used for welding.

c. A capacitance type pickup (which need only be a turn or two or wire about the welding cable, or a plate near the cable) may be used to operate the electrical circuit connected to the liquid crystal. Even the contact or grip of the welder's hand on the welding electrode may be enough for this purpose. This method is useful when the welding is done with alternating current.

d. The electromagnetic radiation from the welding arc may be used whether the welder is operated by alternating current or direct current. This method is rather expensive and bulky.

e. When the welding equipment has a high frequency unit as part of its structure, this radiation can be used to anticipate the arc formation and to energize the liquid crystal.

Figure 5:
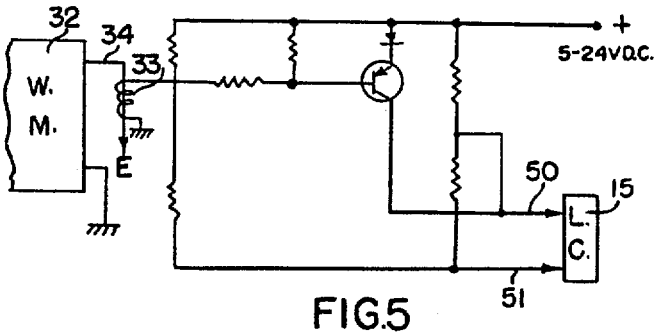
FIG. 5 is an electrical operating circuit for the liquid crystal (designated here and in following Figures as L.C.) wherein in a welding machine which utilizes direct current and the switching device includes a current trnsformer operatively associated with the electrical cable leading to the welding electrode which triggers the switching device.

FIG. 5 is useful with a welding machine 32 which utilizes direct current, and a current transformer 33 operatively associated with the electrical cable 34 leading to the welding electrode E triggers the electrical circuit shown to energize the liquid crystal 15.

Figure 6:
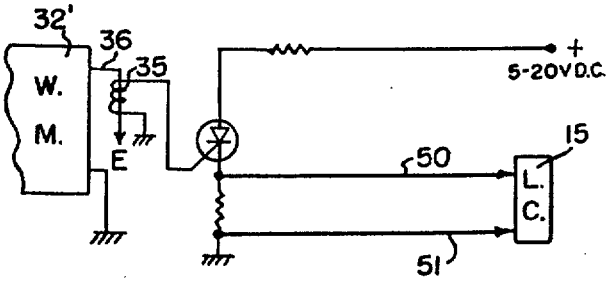
FIG. 6 is an electrical operating circuit for the liquid crystal wherein a welding machine utilizes alternating current and the switching device for energizing the potential across the liquid crystal includes a capacitance type pickup operatively associated with the electrical cable leading to the welding electrode.

FIG. 6 shows an electrical circuit for use with the welding machine 32' which is of the type utilizing alternating current and a capacitance type pickup 35 operatively associated with the electrical cable 36 leading to the welding electrode which triggers the supply of electrical potential to the liquid crystal 15.

Figure 7:
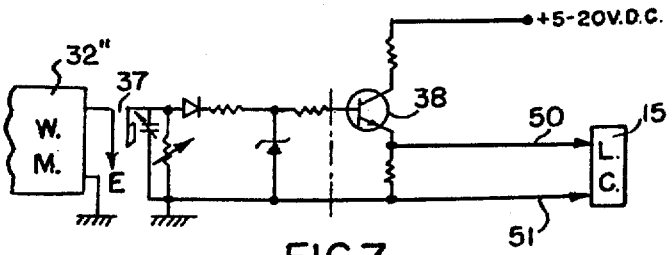
FIG. 7 is an electrical switching circuit for the liquid crystal for use with a welding machine having a high frequency unit and the circuit utilizes a detector responsive to the high frequency for triggering the switching device.

FIG. 7 is for use with a welding machine 32" having a high frequency unit and the triggering circuit is loosely coupled at 37 by a detector responsive to the high frequency for the purpose of energizing the circuit which provides the suitable potential to actuate the liquid crystal 15.

Figure 8:
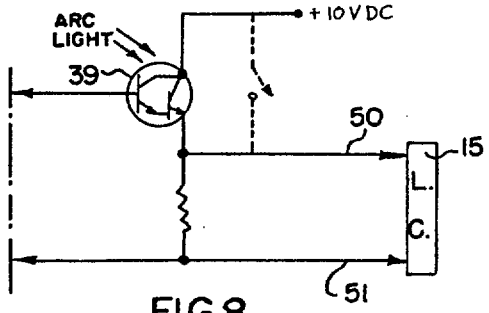
FIG. 8 is a modification of FIG. 7 shown diagrammatically toward the right of the dot-dash line of FIG. 7 and showing a switching device in the same circuit with the high frequency responsive detector, the latter device being responsive to the visible light from a welding arc struck between the welding electrode and the workpiece.

FIG. 8 shows a modification of the right-hand portion of the circuit shown in FIG. 7, to the right of the dot-dash line wherein the SCR 38 of FIG. 7 is substituted by a Photo Darlington NPN Silicon Amplifier which is responsive to arc light indicated as striking the tube 39 in FIG. 8 which occurs as the welding electrode approaches the workpiece. This triggers the supply of electrical potential to the liquid crystal 15 to turn it to its more opaque condition in about 100 micro-seconds.

FIG. 9 is for use with a welding machine 32' utilizing alternating current and it utilizes a voltage transformer 40 operatively associated with the electrical cable 41 leading to the welding electrode E for triggering current to the shown electrical circuit for energizing the liquid crystal 15 to its opaque condition.

FIG. 10 utilizes a circuit for use with a welding machine operated by either direct or alternating current shown at 32 and this has a trigger device at 43 which is a ferrite core antenna which is an electromagnetic-responsive antenna operatively associated with the electrical cable 44 leading to the welding electrode E.

FIG. 11 is a modification of FIG. 9 wherein an additional safety device is indicated at the place indicated by a dotted circle in FIG. 9. This inserts an infra-red detector photocell 42 which is responsive not only to the light from the welding arc but also to the infra-red rays which precede the arc. This triggers the flow to the liquid crystal 15 and also acts as a safety back-up device to be certain that the liquid crystal is energized promptly.

FIG. 12 shows a modification where the photocell 45 is responsive to infra-red rays emitted between the welding electrode and the workpiece upon approach of the electrode close to the workpiece but prior to the striking of the welding arc and operates through an electric amplifier to turn the liquid crystal to a nearly opaque condition.

As used herein, the reference to high frequency welding current in a welding machine refers to high frequency of the order of 100,000 to 2,000,000 cycles per second.

As used herein, the term infra-red rays refers to wave lengths greater than 8,000 angstroms but not more than 0.03 centimeters.

The above described control circuits may be placed wherever desired with the leads for applying potential against the liquid crystal attached to the electrical connections 50 and 51. However, where a photoelectric tube is involved in the circuit, it must be in a position to be affected by the rays emitted by the electrode as it approaches the workpiece, such as placing the same in a suitable position attached to the welder's helmet or to his clothing.

Thus, this invention provides a novel means of protecting a welder from eye damage when performing such welding work.

Those familiar with the welding art will understand that this invention presents an effective means for protecting a welder's eyes, requiring nothing from hinm except that he put on the helmet shown in FIG. 1 and may then go about his work. He does not have to operate a separate switch or any other piece of equipment. He merely picks up his electrode and this invention protects his eyes solely upon approach of the electrode to the workpiece. The liquid crystal shutter shown and described herein operates in about 1/500 of a second whereas solenoids and electromagnets require about 1/25 of a second to operate. It is believed that the eye protection must operate at 1/100 of a second to be completely effective.

What is claimed is:

1. A protective welding lens assembly for use with an electrical welding machine having an electrical energizing circuit and having a welding electrode connected thereto by an electrical cable, said assembly being [planar and] fixedly mounted in a welder's helmet, and comprising a layer of liquid crystal material sandwiched between opposing parallel plates coated [over their entire area] with unbroken transparent conducting films, said films being pretreated by rubbing the same in parallel lines at right angles to each other whereby to control their polarizing effect upon said liquid crystal material, said plates with the enclosed liquid crystal material being disposed between and parallel to a pair of conventional [cross] polarizers so arranged that when a suitable electrical potential is established across said conducting films and said liquid crystal layer the lens assembly will change [from a uniform] *its* light transmitting condition [to a uniform high density approximately opaque condition], and means including a low voltage electrical circuit [electrically associated with said electrical energizing circuit and] responsive [solely] to [approach of] *establishment of an arc between* said welding electrode [to the] *and* work to be welded [by the wearer of the helmet] for applying said suitable electrical potential across said conducting films and said liquid crystal layer [in a period of approximately 1/500 of a second].

2. A welding lens assembly as defined in claim 1, wherein said liquid crystal material is of the nematic type of mesophase with a positive dielectric anisotropism.

3. A welding lens assembly as defined in claim 2, wherein said last named means includes a switching device responsive to visible light from a welding arc struck between a welding electrode and a workpiece upon approach of said electrode close to a workpiece.

4. A welding lens assembly as defined in claim 2, wherein said last named means includes a switching device responsive to infra-red rays emitted from an electrode approaching a workpiece prior to the emission of actinic rays.

[5. A welding lens assembly as defined in claim 2, wherein said welding machine utilizes a direct current, and said last named means includes a current transformer operatively associated with said electrical cable and a switching device in said electrical circuit responsive to current generated in said transformer when said electrode approaches a workpiece.]

[6. A welding lens assembly as defined in claim 2, wherein said welding machine utilizes alternating current and said last named means includes a capacitance type pickup operatively associated with said electrical cable and a switching device in said electrical circuit responsive to change in said capacitance when said electrode is advanced to a workpiece.]

[7. A welding lens assembly as defined in claim 2, for use with a welding machine utilizing direct or alternating current, wherein said last named means includes an electromagnetic-responsive ferrite core antenna operatively associated with said electrical cable, and said last named means includes a switching device in said electrical circuit responsive to a signal from said antenna.]

8. A welding lens assembly as defined in claim 2, for use with a welding machine having a high frequency welding current, wherein said last named means includes a detector responsive to high frequency, and said last named means includes a switching device in said electrical circuit responsive to a signal from said detector.

9. A welding lens assembly as defined in claim 8, including a switching device in circuit with said high frequency detector, said last named switching device responsive to visible light from a welding arc struck between a welding electrode connected with said welding machine and a workpiece upon approach of said electrode close to said workpiece.

[10. A welding lens assembly as defined in claim 2, wherein said welding machine utilizes alternating current, wherein said last named means includes a voltage transformer operatively associated with said electrical cable and a switching device in said electrical circuit responsive to electrical flow from said transformer when said electrode approaches a workpiece.]

[11. A welding lens assembly as defined in claim 10, including a switching device in circuit with said first named switching device, said last named switching device responsive to visible light from a welding arc struck between a welding electrode connected with said welding machine and a workpiece upon approach of said electrode close to said workpiece.]

[12. A welding lens assembly as defined in claim 10, responsive to infra-red rays emitted between a welding electrode and a workpiece upon approach of said electrode close to a workpiece.]

*13. In a welding helmet, a protective welding lens assembly fixed in position within said welding helmet, said assembly comprising a layer of liquid crystal material sandwiched between spaced transparent plates, polarizers on opposite sides of said layer of liquid crystal material, means*

*for applying an electrical potential across said layer of liquid crystal material to thereby vary the light-transmitting characteristics of said lens assembly, and means including a low voltage electrical circuit actuable in response to establishment of an arc between a welding electrode and work to be welded for applying an electric field across said liquid crystal layer to vary the light-transmitting characteristics of the lens assembly.*

*14. The welding lens assembly of claim 13 wherein said liquid crystal material is nematic, said lens assembly incorporating means for effecting a twisted nematic structure in said liquid crystal material.*

*15. The protective welding lens assembly of claim 13 wherein said low voltage electrical circuit includes means responsive to wave energy emitted by a welding arc for applying said electric field across the liquid crystal layer.*

*16. A protective welding lens assembly for use with an electrical welding machine having an electrical energizing circuit and having a welding electrode connected thereto by an electrical cable, said assembly being fixedly mounted in a welder's helmet and comprising a layer of liquid crystal material sandwiched between opposing parallel plates coated with unbroken transparent conducting films, said films being pretreated by rubbing the same in parallel lines at right angles to each other whereby to control their polarizing effect upon said liquid crystal material, said plates with the enclosed liquid crystal material being disposed between and parallel to a pair of conventional polarizers so arranged that when a suitable electrical potential is established across said conducting films and said liquid crystal layer the lens assembly will change its light transmitting condition, and means including a low voltage electrical circuit responsive to a surge of current through said electrical cable upon establishment of a welding arc for applying said suitable electrical potential across said conducting films and said liquid crystal layer.*

*17. A welding lens assembly as defined in claim 16 wherein said welding machine utilizes direct current, and said last-named means includes a current transformer operatively associated with said electrical cable and a switching device in said electrical circuit responsive to current generated in said transformer when said electrode approaches a workpiece.*

*18. A welding lens assembly as defined in claim 16 wherein said welding machine utilizes alternating current, and said last-named means includes a capacitance-type pickup operatively associated with said electrical cable, and a switching device in said electrical circuit responsive to a change in said capacitance when a welding electrode is advanced to a workpiece.*

*19. A welding lens assembly as defined in claim 16 for use with a welding machine utilizing direct or alternating current, wherein said last-named means includes an electromagnetic-responsive ferrite core antenna operatively associated with said electrical cable, and said last-named means includes a switching device in said electrical circuit responsive to a signal from said antenna.*

*20. A welding lens assembly as defined in claim 16 wherein said welding machine utilizes alternating current and said last-named means includes a voltage transformer operatively associated with said electrical cable, and a switching device in said electrical circuit responsive to electrical flow from said transformer when said electrode approaches a workpiece.*

* * * * *